(12) United States Patent
Noritake et al.

(10) Patent No.: US 9,457,708 B2
(45) Date of Patent: Oct. 4, 2016

(54) VEHICLE LAMP STRUCTURE

(71) Applicant: TOYOTA JIDOSHA KABUSHIKI KAISHA, Toyota-shi, Aichi-ken (JP)

(72) Inventors: Yuji Noritake, Toyota (JP); Ken Nishioka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/759,505

(22) PCT Filed: Dec. 19, 2013

(86) PCT No.: PCT/JP2013/084117
§ 371 (c)(1),
(2) Date: Jul. 7, 2015

(87) PCT Pub. No.: WO2014/112288
PCT Pub. Date: Jul. 24, 2014

(65) Prior Publication Data
US 2015/0354774 A1    Dec. 10, 2015

(30) Foreign Application Priority Data
Jan. 17, 2013    (JP) ................................. 2013-006472

(51) Int. Cl.
*F21S 8/10*        (2006.01)
*B60Q 1/00*        (2006.01)
*F21Y 101/02*      (2006.01)

(52) U.S. Cl.
CPC ........... *B60Q 1/0041* (2013.01); *F21S 48/212* (2013.01); *F21S 48/215* (2013.01); *F21S 48/2212* (2013.01); *F21S 48/234* (2013.01); *F21Y 2101/02* (2013.01)

(58) Field of Classification Search
None
See application file for complete search history.

(56) References Cited

U.S. PATENT DOCUMENTS

| 9,249,944 B2 * | 2/2016 | Noritake | ............... F21S 48/24 |
| 2012/0106187 A1 * | 5/2012 | Uchida | ............... B60Q 1/0035 362/516 |
| 2013/0063961 A1 * | 3/2013 | Yamazaki | ........... F21S 48/2212 362/521 |
| 2015/0345731 A1 * | 12/2015 | Noritake | ............. B60Q 1/0041 362/516 |

FOREIGN PATENT DOCUMENTS

JP    2007-053046 A    3/2007

* cited by examiner

*Primary Examiner* — Ashok Patel
(74) *Attorney, Agent, or Firm* — Oliff PLC (57) ABSTRACT

A rear combination lamp is structured to include: a door side lamp portion having a first LED, a first housing and a first lens; and a fender side lamp portion having a second LED, a second housing and a second lens. Further, a first lamp side leg portion is provided at the first lens. Moreover, a second lamp side leg portion that extends along the first lamp side leg portion, and an extending portion that extends toward the door side lamp portion side from a second housing side end portion of the second lamp side leg portion, are provided at the second lens. A distal end of this extending portion is disposed further toward the door side lamp portion side than the first lamp side leg portion, and the distal end of the extending portion is fixed to the second housing.

5 Claims, 4 Drawing Sheets

VEHICLE LAMP STRUCTURE

TECHNICAL FIELD

The present invention relates to a vehicle lamp structure.

BACKGROUND ART

Integral-type vehicle lamps (vehicle combination lamps) that are provided with a cornering lamp and a side turn lamp have been disclosed conventionally (see, for example, Japanese Patent Application Laid-Open (JP-A) No. 2007-53046). To briefly describe the technique disclosed in this document, a cornering lamp bulb and a side turn lamp bulb are provided at the vehicle lamp, respectively at the vehicle front side and the vehicle rear side of a region that is demarcated between the lamp body and the lamp lens. Further, a diffusing portion is provided at the boundary portion between the region at the vehicle front side and the region at the vehicle rear side of the vehicle lamp. The visibility of the side turn lamp from the vehicle side is improved due to the light that is illuminated from the side turn lamp bulb being diffused by this diffusing portion.

SUMMARY OF INVENTION

Technical Problem

However, in a case in which the vehicle lamp that is disclosed in JP-A No. 2007-53046 is made to be a type in which the cornering lamp and the side turn lamp are separate bodies, and the cornering lamp and the side turn lamp are disposed adjacent, it is thought that the region between the cornering lamp and the side turn lamp will not be luminous or that the region between the cornering lamp and the side turn lamp will be dark. In this case, the integral feel of the lamp is insufficient.

In consideration of the above-described circumstances, an object of the present invention is to provide a vehicle lamp structure that can improve the integral feel of a separate-body-type lamp.

Solution to Problem

A vehicle lamp structure relating to a first aspect comprises: a first lamp that has a first housing to which a first light source is mounted, and a first lens that opens toward the first housing side and that, due to an open end thereof being fixed to the first housing, covers the first light source and transmits light illuminated from the first light source, and a first leg portion that extends toward the first housing side is provided at the first lens; and a second lamp that has a second housing to which a second light source is mounted, and a second lens that opens toward the second housing side and that, due to an open end thereof being fixed to the second housing, covers the second light source and transmits light illuminated from the second light source, and a second leg portion that extends along the first leg portion, and an extending portion that extends toward the first lamp side from the second housing side end portion of the second leg portion, are provided at the second lens, and a distal end of the extending portion is disposed further toward the first lamp side than the first leg portion and is fixed to the second housing.

In accordance with the above-described aspect, the first leg portion of the first lens and the second leg portion of the second lens are set in the above-described arrangement. In other words, the first lamp and the second lamp are disposed so as to be adjacent to one another with a predetermined interval therebewteen. When light is illuminated from the first light source that is supported at the first housing, this light is transmitted through the first lens. Namely, the first lamp is lit. Further, when light is illuminated from the second light source that is supported at the second housing, this light is transmitted through the second lens. Namely, the second lamp is lit. Here, in the present invention, the extending portion, that extends toward the first lamp side from the end portion of the second leg portion of the second lens, is provided, and the distal end of this extending portion is disposed further toward the first lamp side than the first leg portion. Moreover, the distal end of the extending portion is fixed to the second housing. Therefore, the first leg portion and the second leg portion can be disposed so as to be adjacent, as compared with a case in which the second housing side end portion of the second leg portion is fixed to the second housing. Further, the light that has penetrated into the second lens of the second lamp (light of the second light source, or sunlight that is illuminated toward the second lens, or the like), advances from the second leg portion toward the extending portion, and further, this light is illuminated from the extending portion toward between the first leg portion and the second leg portion. Due thereto, the region between the first leg portion and the second leg portion (the gap between the first lamp and the second lamp) appearing dark is suppressed.

In a vehicle lamp structure relating to a second aspect, in the above-described first aspect, diffusion inners that diffuse light illuminated from the first light source or the second light source are provided between the first housing and the first lens and between the second housing and the second lens, respectively, and step portions, to which end portions of the diffusion inners are disposed adjacent, are formed at the first leg portion and the second leg portion.

In accordance with the above-described aspect, the diffusion inners are provided within the first lamp and within the second lamp. Therefore, the light of the first light source is diffused by the diffusion inner and is transmitted through the first lens, and the light of the second light source is diffused by the diffusion inner and is transmitted through the second lens. Due thereto, the first lamp and the second lamp shine more uniformly. Further, the lights, that have been introduced into the diffusion inners, advance toward the end portions of these diffusion inners, and these lights are introduced into the first leg portion and into the second leg portion from the step portions that are formed in the first leg portion of the first lens and the second leg portion of the second lens. Then, the lights, that have been introduced into the first leg portion and into the second leg portion, are illuminated from the end portions of the first leg portion and the second leg portion (the end portions at the sides away from the first housing and the second housing).

In a vehicle lamp structure relating to a third aspect, in the above-described first aspect or second aspect, a first lamp side reflector, that reflects, toward the first lens side, light illuminated from the first light source, is provided between the first housing and the first lens, and a reflector, that is concave and that reflects, toward the first lamp side reflector, light of the first light source, is provided between the first housing and the first lens.

In accordance with the above-described aspect, light of the first light source being seen directly from the first lens side can be suppressed.

In a vehicle lamp structure relating to a fourth aspect, in any of the above-described first through third aspects, a second lamp side reflector, that reflects, toward the second lens side, light illuminated from the second light source, is provided between the second housing and the second lens, and a reflector, that is concave and that reflects, toward the second lamp side reflector, light of the second light source, is provided between the second housing and the second lens.

In accordance with the above-described aspect, light of the second light source being seen directly from the second lens side can be suppressed.

In a vehicle lamp structure relating to a fifth aspect, in any of the above-described first through fourth aspects, the first light source and the second light source are made to be LEDs.

In accordance with the above-described aspect, the integral feel of a separate-body-type lamp can be improved even in cases of using LEDs that have directivity.

Advantageous Effects of Invention

The vehicle lamp structures relating to the first aspect, the third aspect, the fourth aspect and the fifth aspect have the excellent effect that the integral feel of a separate-body-type lamp can be improved.

The vehicle lamp structure relating to the second aspect has the excellent effect that the region, that is adjacent to the second lamp, at the first lamp and the region, that is adjacent to the first lamp, at the second lamp being dark can be suppressed.

DESCRIPTION OF EMBODIMENTS

A vehicle lamp structure relating to an embodiment of the present invention is described next by using FIG. 1 through FIG. 4. Note that the vehicle longitudinal direction front side is indicated by arrow FR, the vehicle transverse direction outer side is indicated by arrow OUT, and the vehicle vertical direction upper side is indicated by arrow UP. Further, in the following description, when merely longitudinal and vertical directions are mentioned, they refer to the longitudinal of the vehicle longitudinal direction and the vertical of the vehicle vertical direction.

Figure 4:
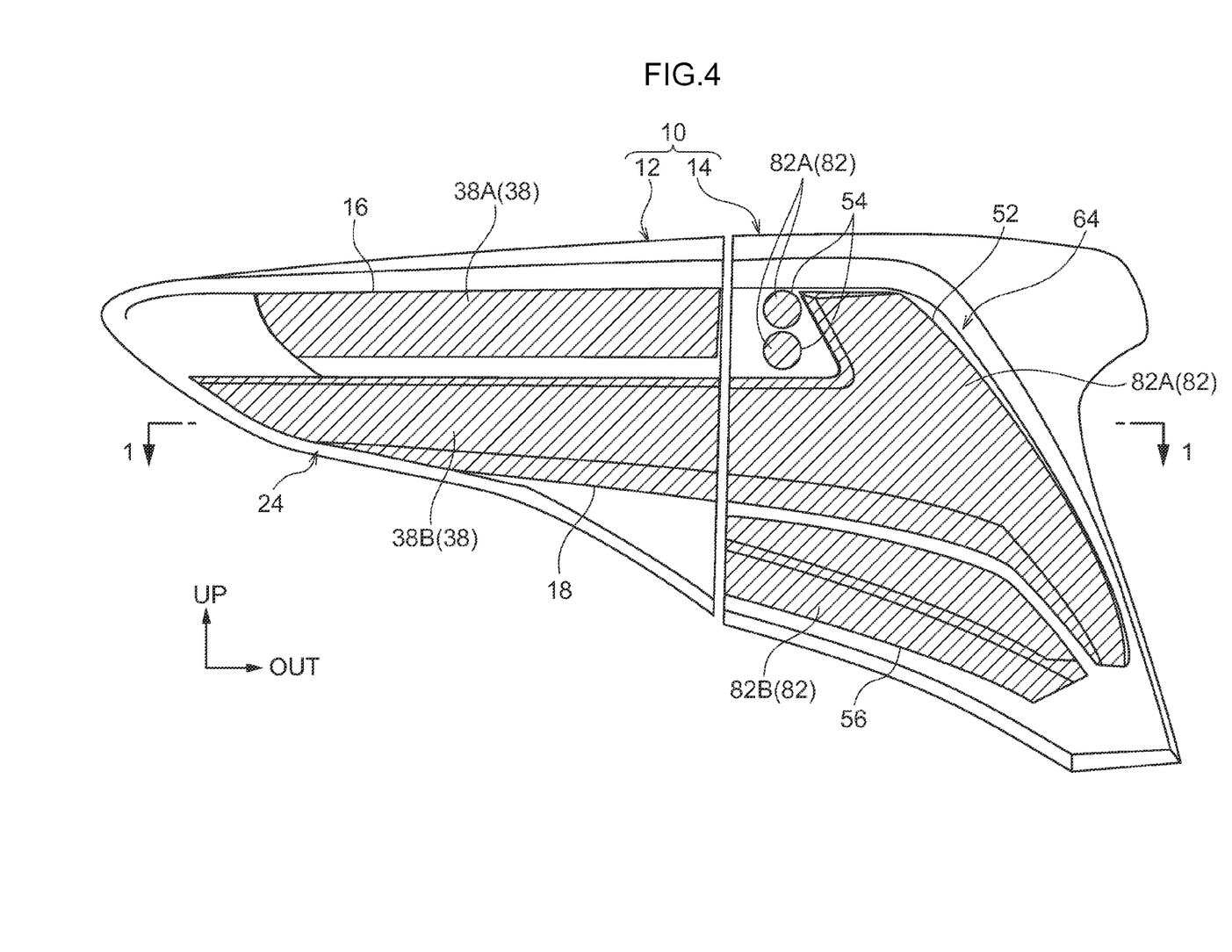
FIG. 4 is an elevation drawing in which the rear combination lamp is seen from the rear side of a vehicle.

As shown in FIG. 4, the vehicle lamp structure of the present embodiment is applied to a rear combination lamp 10 that serves as a vehicle lamp that is provided at the rear portion of a vehicle. This rear combination lamp 10 is structured to have a door side lamp portion 12 that serves as a first lamp and is mounted to an unillustrated back door that closes a back door opening portion, and a fender side lamp portion 14 that serves as a second lamp and is mounted to the rear end portion of an unillustrated rear fender. Further, the door side lamp portion 12 and the fender side lamp portion 14 are disposed so as to be adjacent to one another in the state in which the back door is closed. Hereinafter, first, the door side lamp portion 12 is described, and then the fender side lamp portion 14 is described.

(Door Side Lamp Portion 12)

The door side lamp portion 12 is structured to have a back lamp 16 that, by illuminating light that is substantially white toward the vehicle rear side, makes others recognize that the vehicle is reversing, and a tail lamp 18 that, by illuminating red light toward the vehicle rear side, makes others recognize the existence of the vehicle.

Figure 1:
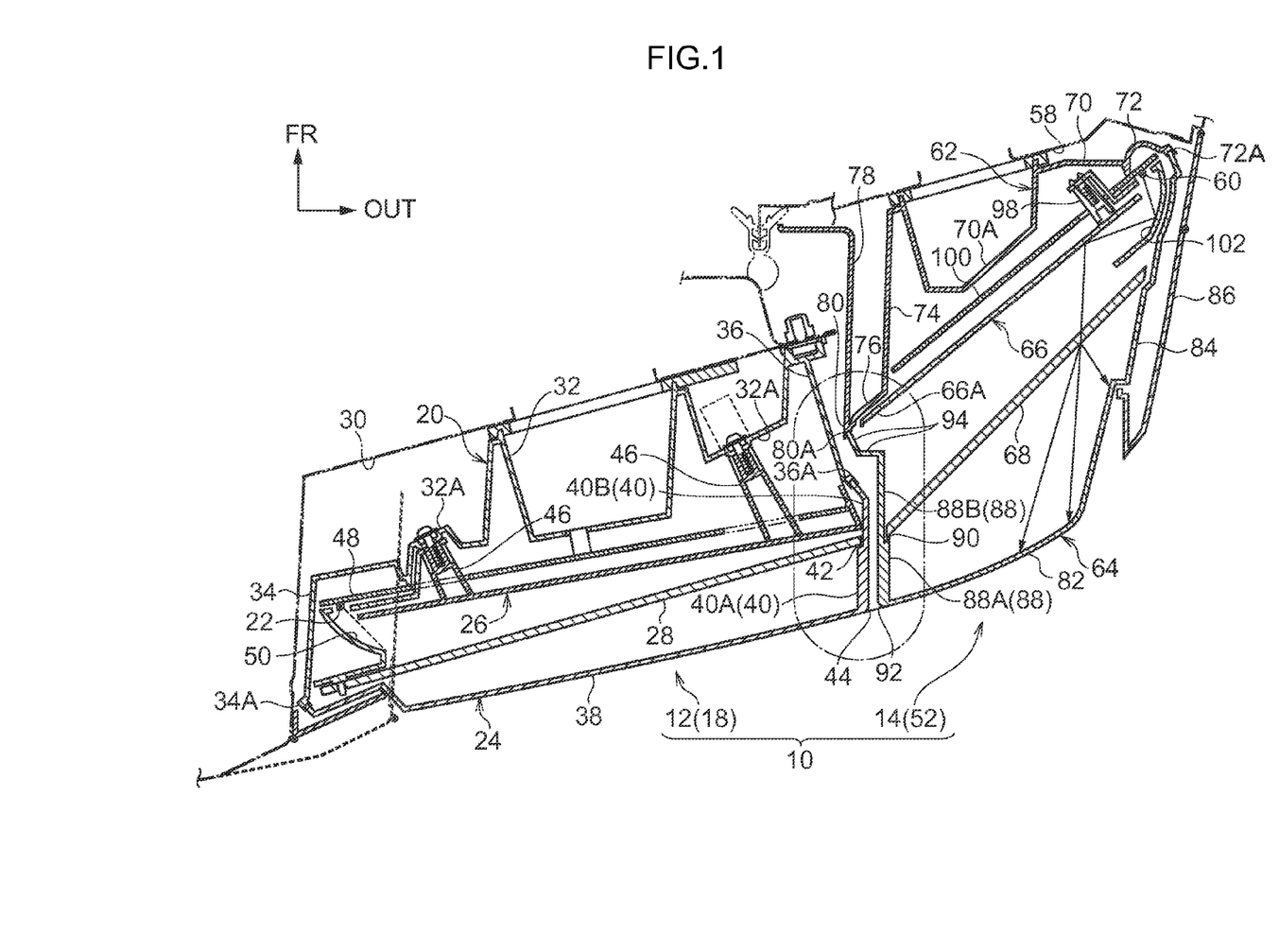
FIG. 1 is a cross-sectional view showing the cross-section of a rear combination lamp that is cut along line 1-1 shown in FIG. 4.

As shown in FIG. 1, the door side lamp portion 12, that has the back lamp 16 and the tail lamp 18, has a first housing 20 that, by being fixed to the back door, supports the door side lamp portion 12, and supports the light sources of the back lamp 16 and the tail lamp 18 (an incandescent bulb for the back lamp and a first LED 22 that serves as a first light source). Further, the door side lamp portion 12 has a first lens 24 that, by being fixed to the first housing 20, covers the incandescent bulb (not illustrated) for the back lamp and the first LED 22, and transmits the lights that are illuminated from the incandescent bulb for the back lamp and the first LED 22. Moreover, a first lamp side reflector 26, that reflects, toward the first lens 24 side, the light illuminated from the first LED 22, and a first lamp side diffusion inner 28, that serves as a diffusion inner and diffuses the light reflected by this first lamp side reflector 26, are provided between the first housing 20 and the first lens 24.

The first housing 20 is formed in the shape of a box that opens toward the vehicle rear side, and further, the first housing 20 has a bottom wall 32 that is fixed to a back door panel 30 that structures a portion of the back door. Further, reflector mounting portions 32A, that are formed in shapes that are convex toward the vehicle rear side and to which are mounted the first lamp side reflector 26 that is described in detail later, are formed at this bottom wall 32. Further, the first housing 20 has an inner wall 34 that extends from the vehicle transverse direction inner side end portion of the bottom wall 32 toward the vehicle rear side. The vehicle rear side end portion of this inner wall 34 is made to be a fixing portion 34A to which the first lens 24 is fixed. Moreover, the first housing 20 has an outer wall 36 that extends from the vehicle transverse direction outer side end portion of the bottom wall 32 toward the vehicle rear side. This outer wall 36 extends at an incline toward the vehicle transverse direction outer side while heading toward the vehicle rear side, and further, the vehicle rear side end portion of the outer wall 36 is made to be a fixing portion 36A to which the first lens 24 is fixed.

The first lens 24 is formed in the shape of a box that opens toward the vehicle front side. Further, as shown in FIG. 4, the first lens 24 extends in the vehicle transverse direction and the vehicle vertical direction, and has a bottom wall 38 that is formed in a rectangular shape that narrows toward the vehicle transverse direction inner side as seen from the vehicle rear side. The vehicle upper side region of this bottom wall 38 is made to be a back lamp light transmitting portion 38A that is colorless and transparent. Further, the region at the lower side of the back lamp light transmitting portion 38A is made to be a tail lamp light transmitting portion 38B that is red and transparent. Further, as shown in FIG. 1, the vehicle transverse direction inner side end portion of the bottom wall 38 is fixed to the fixing portion 34A of the first housing 20.

Figure 2:
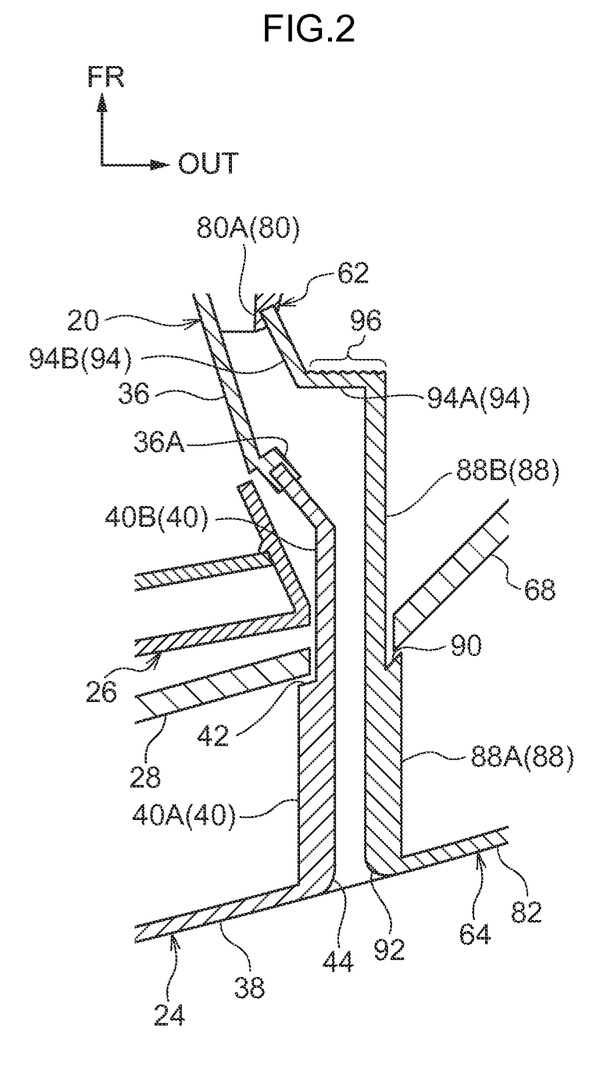
FIG. 2 is an enlarged sectional view showing, in an enlarged manner, the region surrounded by the one-dot chain line shown in FIG. 1.
Figure 3:
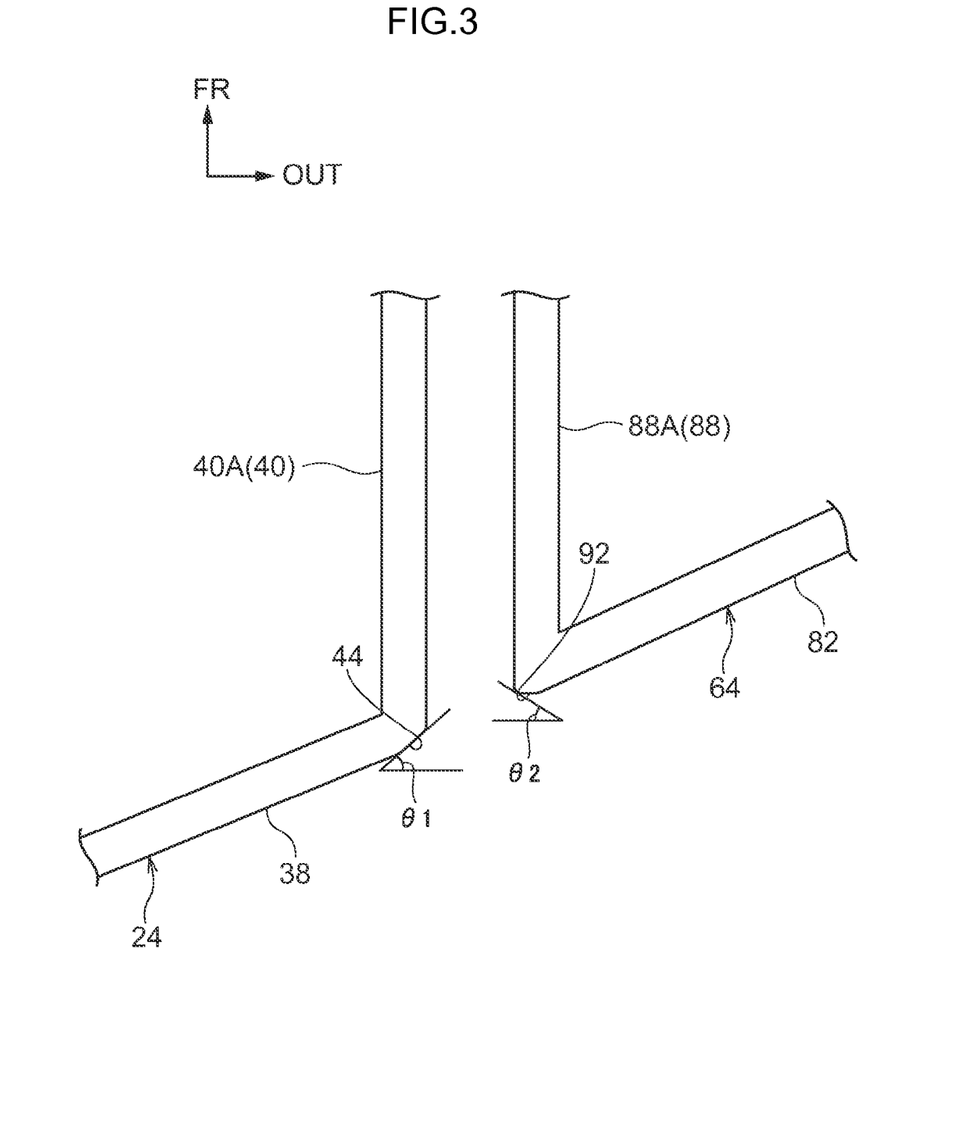
FIG. 3 is an enlarged sectional view showing, in a further enlarged manner, the region surrounded by the one-dot chain line shown in FIG. 1.

Further, as shown in FIG. 2, the first lens 24 has a first lamp side leg portion 40 that serves as a first leg portion and that extends from the vehicle transverse direction outer side end portion of the bottom wall 38 toward the vehicle front side. The vehicle rear side region of this first lamp side leg portion 40 is made to be a thick-walled portion 40A whose plate thickness in the vehicle transverse direction is thick, and further, the vehicle front side region of the first lamp side leg portion 40 is made to be a thin-walled portion 40B whose plate thickness in the vehicle transverse direction is thin as compared with the thick-walled portion 40A. Further, the front end portion of the thin-walled portion 40B is bent toward the vehicle transverse direction inner side. The distal end of this bent region is fixed to the fixing portion 36A of the first housing 20. Further, a step portion 42 is formed at the boundary portion between the thick-walled portion 40A and the thin-walled portion 40B at the first lamp side leg portion 40, at the surface at the vehicle transverse direction inner side. Moreover, as shown in FIG. 3, the rear end portion of the thick-walled portion 40A of the first lamp side leg portion 40 (the end portion at the side away from the first housing 20) is made to be a corner portion 44 at which angle θ1, that is formed with the direction in which the thick-walled portion 40A extends, is set to be an angle that is less than the angle of total reflection. Note that, in the present embodiment, because the first lens 24 is formed by using an acrylic resin, the aforementioned angle θ1 is set to be an angle that is less than 42.2 deg.

As shown in FIG. 1, the first lamp side reflector 26 is formed in the shape of a plate that extends in the vehicle transverse direction and the vehicle vertical direction, and further, supported portions 46, that are supported by the reflector mounting portions 32A of the first housing 20, are provided upright at the vehicle front side surface of the first lamp side reflector 26. Moreover, the vehicle rear side surface of the first lamp side reflector 26 is made to be a mirror surface by aluminum deposition or the like.

The first LED 22 is mounted to the vehicle transverse direction inner side end portion of a substrate 48, and further, the first LED 22 emits light due to electric power being supplied thereto via the substrate 48. Moreover, the first LED 22 is fixed to the interior of the door side lamp portion 12 due to the substrate 48 being supported at the first housing 20. Further, a reflector 50 that is concave is provided at the rear side of the first LED 22. This is a structure in which the light of the first LED 22 is reflected by this concave reflector 50 toward the vehicle rear side surface of the first lamp side reflector 26.

The first lamp side diffusion inner 28 is disposed at the vehicle rear side of the first lamp side reflector 26, and further, the first lamp side diffusion inner 28 is formed in the shape of a plate that extends in the vehicle transverse direction and the vehicle vertical direction. Further, unillustrated lens cuts, for diffusing the light of the first LED 22 that was reflected by the first lamp side reflector 26, are provided at the first lamp side diffusion inner 28. This is a structure in which, due to light of the first LED 22 being transmitted through the first lamp side diffusion inner 28, the light of the first LED 22 is diffused over a wide range in the vehicle transverse direction and the vehicle vertical direction. Moreover, as shown in FIG. 2, the vehicle transverse direction inner side end portion of the first lamp side diffusion inner 28 is supported by the above-described reflector 50, and the vehicle transverse direction outer side end portion of the first lamp side diffusion inner 28 is disposed adjacent to the step portion 42 that is formed at the first lamp side leg portion 40 of the first lens 24.

(Fender Side Lamp Portion 14)

As shown in FIG. 4, the fender side lamp portion 14 is structured to have a tail-and-stop lamp 52 that makes others recognize the existence of the vehicle by being lit at substantially the same illuminance as the tail lamp 18 of the door side lamp portion 12, and makes others recognize that the vehicle is decelerating by being lit at a higher illuminance when the vehicle decelerates, two stop lamps 54 that make others recognize that the vehicle is decelerating by being lit independently of the tail-and-stop lamp 52, and a turn signal lamp 56 that makes others recognize that the vehicle is changing lanes or the like by blinking at a predetermined period.

Further, as shown in FIG. 1, the fender side lamp portion 14 has a second housing 62 that, by being fixed to a rear end portion 58 of the rear fender, supports the fender side lamp portion 14, and supports the light sources of the tail-and-stop lamp 52, the stop lamps 54, and the turn signal lamp 56 (a second LED 60 that serves as a second light source, LEDs (not illustrated) for the stop lamps, and an incandescent bulb (not illustrated) for the turn signal lamp). Further, the fender side lamp portion 14 has a second lens 64 that, by being fixed to the second housing 62, covers the second LED 60, the LEDs for the stop lamps and the incandescent bulb for the turn signal lamp, and transmits the lights that are illuminated from the second LED 60, the LEDs for the stop lamps and the incandescent bulb for the turn signal lamp. Moreover, a second lamp side reflector 66, that reflects, toward the second lens 64 side, the light illuminated from the second LED 60, and a second lamp side diffusion inner 68, that serves as a diffusion inner and diffuses the light reflected by this second lamp side reflector 66, are provided between the second housing 62 and the second lens 64.

The second housing 62 is formed in the shape of a box that opens toward the vehicle rear side, and further, the second housing 62 has a bottom wall 70 that is fixed to the rear end portion 58 of the rear fender. Further, a bulging portion 70A that bulges-out toward the vehicle rear side is formed at the vehicle transverse direction intermediate portion of the bottom wall 70. Further, a projecting portion 72 that projects-out toward the vehicle front side is formed at the vehicle transverse direction outer side end portion of the bottom wall 70. The vehicle transverse direction outer side end portion of this projecting portion 72 is made to be a fixing portion 72A to which the second lens 64 is fixed. Further, the second housing 62 has a first inner wall portion 74 that extends toward the vehicle front side from the vehicle transverse direction inner side end portion of the bottom wall 70, an inclined wall portion 76 that extends from the rear end of the first inner wall portion 74 at an incline toward the vehicle rear side while heading toward the vehicle transverse direction inner side, and a second inner wall portion 78 that extends toward the vehicle front side from the vehicle transverse direction inner side end portion of the inclined wall portion 76. Moreover, the border portion between the inclined wall portion 76 and the second inner wall portion 78 projects-out toward the vehicle rear side, and the distal end of this projecting-out portion 80 is made to be a fixing portion 80A with the second lens 64.

The second lens 64 is formed in the shape of a box that opens toward the vehicle front side. Further, as shown in FIG. 4, the second lens 64 extends in the vehicle transverse direction and the vehicle vertical direction, and has a bottom wall 82 that is formed in a substantially rectangular shape as seen from the vehicle rear side. The vehicle upper side region of this bottom wall 82 is made to be a tail lamp and stop lamp light transmitting portion 82A that is red and transparent. Further, the vehicle lower side region of the bottom wall 82 is made to be a turn signal lamp light transmitting portion 82B that is orange and transparent. Further, as shown in FIG. 1, the second lens 64 has an outer side leg portion 84 that extends from the vehicle transverse direction outer side end portion of the bottom wall 82 toward the vehicle front side. The distal end of this outer side leg portion 84 is fixed to the fixing portion 72A of the second housing 62. Moreover, a garnish 86 is provided at the vehicle transverse direction outer side of the outer side leg portion 84.

Further, as shown in FIG. 2, the second lens 64 has a second lamp side leg portion 88 that serves as a second leg portion and that extends along the first lamp side leg portion 40 of the first lens 24 from the vehicle transverse direction inner side end portion of the bottom wall 82. The vehicle rear side region of this second lamp side leg portion 88 is made to be a thick-walled portion 88A whose plate thickness in the vehicle transverse direction is thick, and further, the vehicle front side region of the second lamp side leg portion 88 is made to be a thin-walled portion 88B whose plate thickness in the vehicle transverse direction is thin as compared with the thick-walled portion 88A. Moreover, a step portion 90 is formed at the boundary portion between the thick-walled portion 88A and the thin-walled portion 88B at the second lamp side leg portion 88, at the surface at the vehicle transverse direction outer side. Moreover, as shown in FIG. 3, the rear end portion of the thick-walled portion 88A of the second lamp side leg portion 88 (the end portion at the side away from the second housing 62) is made to be a corner portion 92 at which angle $\theta2$, that is formed with the direction in which the thick-walled portion 88A extends, is set to be an angle that is less than the angle of total reflection. Note that, in the present embodiment, in the same way as the above-described first lens 24, because the second lens 64 is formed by using an acrylic resin, the aforementioned angle $\theta2$ is set to be an angle that is less than 42.2 deg.

Further, as shown in FIG. 2, the second lens 64 has an extending portion 94 that extends toward the vehicle transverse direction inner side from the front end portion of the second lamp side leg portion 88. This extending portion 94 has a facing portion 94A at which the proximal end side extends in the vehicle transverse direction, and an inclined wall portion 94B at which the distal end side (the vehicle transverse direction inner side) is bent toward the vehicle front side. Further, lens cuts 96 that introduce, into the second lens 64, the light that was illuminated from a gap reflecting portion 66A toward the facing portion 94A, are formed at the vehicle front side surface of the facing portion 94A. Further, the distal end of the inclined wall portion 94B is fixed to the fixing portion 80A of the second housing 62.

As shown in FIG. 1, the second lamp side reflector 66 is formed in the shape of a plate that extends in the vehicle vertical direction, and further, the second lamp side reflector 66 is disposed at an incline toward the vehicle transverse direction outer side. Moreover, a supported portion 98, that is supported by the second housing 62, is provided upright at the vehicle front side surface of the second lamp side reflector 66. Further, the vehicle rear side surface of the second lamp side reflector 66 is made to be a mirror surface by aluminum deposition or the like. Due thereto, the light that is illuminated from the second LED 60 can be reflected toward the bottom wall 82 side of the second lens 64. Moreover, the vehicle transverse direction inner side end portion of the second lamp side reflector 66 is made to be the gap reflecting portion 66A that is disposed along the inclined wall portion 76 of the second housing 62. This gap reflecting portion 66A is disposed so as to face the facing portion 94A of the second lens 64 in the vehicle longitudinal direction. Due thereto, there is a structure in which the light that is illuminated from the second LED 60 can, via the gap reflecting portion 66A, be reflected to between the first lamp side leg portion 40 of the first lens 24 and the second lamp side leg portion 88 of the second lens 64.

The second LED 60 is mounted to the vehicle transverse direction outer side end portion of a substrate 100, and, further, in the same way as the above-described first LED 22, the second LED 60 emits light due to electric power being supplied thereto via the substrate 100. Moreover, the second LED 60 is fixed to the interior of the fender side lamp portion 14 due to the substrate 100 being supported at the second housing 62. Further, a reflector 102 that is concave is provided at the rear side of the second LED 60. This is a structure in which the light of the second LED 60 is reflected by this concave reflector 102 toward the vehicle rear side surface of the second lamp side reflector 66.

The second lamp side diffusion inner 68 is disposed at the vehicle rear side of the second lamp side reflector 66, and, further, the second lamp side diffusion inner 68 is formed in the shape of a plate that extends in substantially the same direction as the second lamp side reflector 66. Further, unillustrated lens cuts, for diffusing the light of the second LED 60 that was reflected by the second lamp side reflector 66, are provided at the second lamp side diffusion inner 68. This is a structure in which, due to light of the second LED 60 being transmitted through the second lamp side diffusion inner 68, the light of the second LED 60 is diffused over a wide range in the vehicle transverse direction and the vehicle vertical direction. Moreover, as shown in FIG. 2, the vehicle transverse direction inner side end portion of the second lamp side diffusion inner 68 is disposed adjacent to the step portion 90 that is formed at the second lamp side leg portion 88 of the second lens 64.

(Operation and Effects of Present Embodiment)

Operation and effects of the present embodiment are described next.

As shown in FIG. 1, in the present embodiment, when light is illuminated from the first LED 22, this light is transmitted through the first lens 24. Namely, the tail lamp 18 (see FIG. 4) is lit. Further, when light is illuminated from the second LED 60, this light is, after being reflected by the second lamp side reflector 66, transmitted through the second lens 64. Namely, the tail-and-stop lamp 52 is lit. Here, in the present embodiment, a portion of the second lamp side reflector 66 is made to be the gap reflecting portion 66A that reflects light, that has been illuminated from the second LED 60, to between the first lamp side leg portion 40 of the first lens 24 and the second lamp side leg portion 88 of the second lens 64. Therefore, when the tail-and-stop lamp 52 is lit, the region between the first lamp side leg portion 40 of the first lens 24 and the second lamp side leg portion 88 of the second lens 64 shines (the region between the door side lamp portion 12 and the fender side lamp portion 14 shines). Namely, in the present embodiment, the integral feel of the rear combination lamp 10, that is a separate-body-type, can be improved.

Further, in the present embodiment, the second lens 64 has the above-described second lamp side leg portion 88 and facing portion 94. Therefore, a portion of the light, that has been reflected by the gap reflecting portion 66A of the second lamp side reflector 66, is transmitted through the facing portion 94A, and causes the region between the first lamp side leg portion 40 of the first lens 24 and the second lamp side leg portion 88 of the second lens 64 to be luminous. Further, another portion of the light that has been reflected by the gap reflecting portion 66A of the second lamp side reflector 66 is, after being introduced into the facing portion 94A, illuminated from the end portion of the second lamp side leg portion 88 (the end portion at the side away from the second housing). Due thereto, in the state in which the tail-and-stop lamp 52 is lit, the vicinity of the second lamp side leg portion at the tail-and-stop lamp 52 being dark can be suppressed.

Moreover, as shown in FIG. 2, in the present embodiment, the above-described lens cuts 96 are provided at the facing portion 94A of the second lens 64. Due thereto, the light, that has been reflected by the gap reflecting portion 66A of the second lamp side reflector 66, passes through the facing portion 94 and is easily introduced into the second lens 64. Further, the light that has been introduced into the facing portion 94A is illuminated from the end portion of the second lamp side leg portion 88 (the end portion at the side away from the second housing 62). Due thereto, in the state in which the tail-and-stop lamp 52 is lit, the vicinity of the second lamp side leg portion 88 at the tail-and-stop lamp 52 being dark can be suppressed even more.

Further, as shown in FIG. 1, in the present embodiment, the second lamp side diffusion inner 68, that diffuses the light reflected by the second lamp side reflector 66, is provided between the second lamp side reflector 66 and the second lens 64. Therefore, the light that has been reflected by the second lamp side reflector 66 is diffused by the second lamp side diffusion inner 68 and is transmitted through the second lens 64. Due thereto, the tail-and-stop lamp 52 can be made to shine more uniformly. Further, the light that has been introduced into the second lamp side diffusion inner 68 advances toward the end portion of the second lamp side diffusion inner 68 (the vehicle transverse direction inner side end portion), and this light is introduced from the step portion 90, that is formed at the second lamp side leg portion 88 of the second lens 64, into the second lamp side leg portion 88. Then, the light that has been introduced into the second lamp side leg portion 88 is illuminated from the end portion of this second lamp side leg portion 88 (the end portion at the side away from the second housing 62). Due thereto, in the present embodiment, the vicinity of the second lamp side leg portion 88 at the tail-and-stop lamp 52 being dark can be suppressed even more.

Moreover, in the present embodiment, the above-described first lamp side reflector 26 and first lamp side diffusion inner 28 are provided between the first housing 20 and the first lens 24. Therefore, the light that has been reflected by the first lamp side reflector 26 is diffused by the first lamp side diffusion inner 28, and is transmitted through the first lens 24. Due thereto, the tail lamp 18 can be made to shine more uniformly. Further, the light that has been introduced into the first lamp side diffusion inner 28 advances toward the end portion of the first lamp side diffusion inner 28 (the vehicle transverse direction outer side end portion), and this light is introduced into the first lamp side leg portion 40 from the step portion 40 that is formed at the first lamp side leg portion 40 of the first lens 24. Then, the light that has been introduced into the first lamp side leg portion 40 is illuminated from the end portion of the first lamp side leg portion 40 (the end portion at the side away from the first housing 20). Due thereto, in the present embodiment, the vicinity of the first lamp side leg portion 40 at the tail lamp 18 being dark can be suppressed even more.

Further, as shown in FIG. 3, in the present embodiment, the rear end portion of the first lamp side leg portion 40 and the rear end portion of the second lamp side leg portion 88 are made to be the above-described corner portions 44, 92. Therefore, the light, that advances toward the rear end portion of the first lamp side leg portion 40, and the light, that advances toward the rear end portion of the second lamp side leg portion 88, are respectively illuminated from the rear end portion of the first lamp side leg portion 40 and the rear end portion of the second lamp side leg portion 88 without being totally reflected at the corner portions 44, 92. Due thereto, in the present embodiment, the boundary portion between the door side lamp portion 12 and the fender side lamp portion 14 being dark can be suppressed even more.

Moreover, as shown in FIG. 2, in the present embodiment, the distal end of the extending portion 94 of the second lens 64 (the distal end of the inclined wall portion 94B) is fixed to the fixing portion 80A of the second housing 62. Therefore, as compared with a case in which the end portion at the second housing 62 side of the second lamp side leg portion 88 is fixed to the second housing 62, it is difficult to be affected by the vehicle transverse direction dimension of the fixing portion 80A, and the first lamp side leg portion 40 of the first lens 24 and the second lamp side leg portion 88 of the second lens 64 can be disposed adjacent. Namely, the door side lamp portion 12 and the fender side lamp portion 14 that structure the rear combination lamp 10 can be disposed adjacent. Due thereto, in the present embodiment, the integral feel of the rear combination lamp 10, that is a separate-body-type, can be improved.

Operation and effects in the state in which the tail lamp 18 and the tail-and-stop lamp 52 are not lit are described next.

In the present embodiment, when, due to sunlight or the like being illuminated toward the bottom wall 82 and the like of the second lens 64, this light such as sunlight or the like penetrates into the second lens 64, this light advances from the second lamp side leg portion 88 toward the extending portion 94, and moreover, this light is illuminated from the facing portion 94A of the extending portion 94 toward between the first lamp side leg portion 40 and the second lamp side leg portion 88. Due thereto, the region between the first lamp side leg portion 40 and the second lamp side leg portion 88 (the gap between the door side lamp portion 12 and the fender side lamp portion 14) appearing dark is suppressed. Due thereto, in the present embodiment, the integral feel of the rear combination lamp 10 can be improved even in a state in which the tail lamp 18 and the tail-and-stop lamp 52 are not lit.

Further, in the present embodiment, the first lamp side diffusion inner 28 is provided within the door side lamp portion 12, and the second lamp side diffusion inner 68 is provided within the fender side lamp portion 14. Therefore, when light such as sunlight or the like is introduced into the diffusion inners (into the first lamp side diffusion inner 28 and the second lamp side diffusion inner 68), this light advances toward the end portions of the diffusion inners, and moreover, this light is introduced into the first lamp side leg portion 40 and into the second lamp side leg portion 88 from the step portions 42, 90 that are formed in the first lamp side leg portion 40 of the first lens 24 and the second lamp side leg portion 88 of the second lens 64. Then, the light, that has been introduced into the first lamp side leg portion 40 and into the second lamp side leg portion 88, is illuminated from the end portions of the first lamp side leg portion 40 and the second lamp side leg portion 88 (the end portions at the vehicle rear side). Due thereto, the boundary portion between the door side lamp portion 12 and the fender side lamp portion 14 appearing dark is suppressed, and the integral feel of the rear combination lamp 10 improves even more.

Note that, in the present embodiment, an example is described in which the step portions 42, 90 are provided in the first lamp side leg portion 40 of the first lens 24 and the second lamp side leg portion 88 of the second lens 64, and the end portions of the diffusion inners (the first lamp side diffusion inner 28 and the second lamp side diffusion inner 68) are disposed adjacent to the step portions 42, 90. However, the present invention is not limited to this. Namely, there can be a structure in which the step portions 42, 90 are not provided, and further, there can be a structure in which the diffusion inners are not provided. Whether or not to provide the step portions 42, 90 and the diffusion inners may be set appropriately in consideration of the light reflection characteristics of the reflectors (the first lamp side reflector 26 and the second lamp side reflector 66) and the like.

Further, in the present embodiment, an example is described in which the rear end portion of the first lamp side leg portion 40 and the rear end portion of the second lamp side leg portion 88 are made to be the above-described corner portions 44, 92, but the present invention is not limited to this. For example, there may be a structure in which the above-described corner portions 44, 92 are not provided, if the integral feel of the rear combination lamp 10 is not compromised even if the light, that advances toward the rear end portion of the first lamp side leg portion 40, and the light, that advances toward the rear end portion of the second lamp side leg portion 88, are totally reflected at the respective rear end portions.

Moreover, although the present embodiment describes an example in which the present invention is applied to the rear combination lamp 10, the present invention can be applied to another vehicle lamp that is a separate-body-type lamp.

Although an embodiment of the present invention has been described above, the present invention is not limited to the above, and, of course, can be implemented by being modified in various ways other than the above, within a scope that does not deviate from the gist thereof.

The invention claimed is:

1. A vehicle lamp structure comprising:

a first lamp that has a first housing to which a first light source is mounted, and a first lens that opens toward the first housing side and that, due to an open end thereof being fixed to the first housing, and covers the first light source and transmits light illuminated from the first light source, wherein a first leg portion that extends toward the first housing side is provided at the first lens; and a second lamp that has a second housing to which a second light source is mounted, and a second lens that opens toward the second housing side and that, due to an open end thereof being fixed to the second housing, and covers the second light source and transmits light illuminated from the second light source, wherein a second leg portion that extends along the first leg portion, and an extending portion that extends toward the first lamp side from the second housing side end portion of the second leg portion, are provided at the second lens, and a distal end of the extending portion is disposed further toward the first lamp side than the first leg portion and is fixed to the second housing.

2. The vehicle lamp structure of claim 1, wherein diffusion inners that diffuse light illuminated from the first light source or the second light source are provided between the first housing and the first lens and between the second housing and the second lens, respectively, and step portions, to which end portions of the diffusion inners are disposed adjacent, are formed at the first leg portion and the second leg portion.

3. The vehicle lamp structure of claim 1, wherein a first lamp side reflector, that reflects, toward the first lens side, light illuminated from the first light source, is provided between the first housing and the first lens, and a reflector, that is concave and that reflects, toward the first lamp side reflector, light of the first light source, is provided between the first housing and the first lens.

4. The vehicle lamp structure of claim 1, wherein a second lamp side reflector, that reflects, toward the second lens side, light illuminated from the second light source, is provided between the second housing and the second lens, and a reflector, that is concave and that reflects, toward the second lamp side reflector, light of the second light source, is provided between the second housing and the second lens.

5. The vehicle lamp structure of claim 1, wherein the first light source and the second light source are made to be LEDs.

* * * * *